(12) United States Patent
Eder et al.

(10) Patent No.: US 7,979,782 B2
(45) Date of Patent: Jul. 12, 2011

(54) LOW COMPLEXITY BLIND TRANSPORT FORMAT DETECTION

(75) Inventors: Franz Eder, Burgthann (DE); Pierre Demaj, Nice (FR)

(73) Assignee: ST-Ericsson SA, Plan-les-Ouates (CH)

( * ) Notice: Subject to any disclaimer, the term of this patent is extended or adjusted under 35 U.S.C. 154(b) by 750 days.

(21) Appl. No.: 11/722,683

(22) PCT Filed: Dec. 16, 2005

(86) PCT No.: PCT/IB2005/054290
§ 371 (c)(1),
(2), (4) Date: Apr. 22, 2008

(87) PCT Pub. No.: WO2006/067720
PCT Pub. Date: Jun. 29, 2006

(65) Prior Publication Data
US 2009/0119570 A1  May 7, 2009

(30) Foreign Application Priority Data

Dec. 23, 2004 (EP) .................................... 04106920
Feb. 14, 2005 (EP) .................................... 05101091

(51) Int. Cl.
*H03M 13/03* (2006.01)
(52) U.S. Cl. .................. 714/795; 714/792; 714/821
(58) Field of Classification Search .................. 714/795, 714/792, 760, 821, 794, 712
See application file for complete search history.

(56) References Cited

U.S. PATENT DOCUMENTS

| | | | |
|---|---|---|---|
| 7,665,010 B2 * | 2/2010 | Fisher-Jeffes et al. | 714/792 |
| 7,730,381 B2 * | 6/2010 | Butala et al. | 714/760 |
| 2003/0114456 A1 * | 6/2003 | Rosales et al. | 514/242 |
| 2007/0153693 A1 * | 7/2007 | Takanashi | 370/232 |

FOREIGN PATENT DOCUMENTS

WO  2003101026 A1  12/2003

OTHER PUBLICATIONS

Sohn, I; et al "Blind Rate Detection Algorithm in W-CDMA Mobile Receiver" VTC Fall 2001. IEEE 54th Vehicular Technology Conference. Proceedings. vol. 3, Conference 54, Oct. 7, 2001, pp. 1589-1592.

Okumura, Y; et al "Variable-Rate Data Transmission With Blind Rate Detection for Coherent DS-CDMA Mobile Radio" IEICE Transactions on Communications, Communications Society, vol. E81-B, No. 7, Jul. 1998, pp. 1365-1372.

* cited by examiner

*Primary Examiner* — Fritz Alphonse
(74) *Attorney, Agent, or Firm* — Jeremiah J. Baunach; Seed IP Law Group PLLC (57) ABSTRACT

Provided is a method, apparatus and computer program product for detecting a transport format of a multiplexed transport channel used for transferring binary data. A path metric value is determined, which estimates likelihood for a hypothetical trellis path to end at a predetermined state, for every state of a trellis stage of a possible end bit position of a data block of the transport channel. Then, for each possible end bit position a number of path metric values which indicate higher likelihood for the hypothetical trellis path to end at said predetermined state than an initial state is calculated, and the best end bit positions which lead to highest values of the calculated number are selected and error checking is performed for the selected best end bit positions to detect the transport format. The proposed selection of best end bit positions leads to a reduced number of decoding operations.

13 Claims, 3 Drawing Sheets

| $n_{TF}$ | 15 | | | | | | | | | | | | | |
|---|---|---|---|---|---|---|---|---|---|---|---|---|---|---|
| $s_{TB}$ | 472 | 232 | 152 | 112 | 88 | 72 | 52 | 40 | 32 | 24 | 22 | 16 | 12 | 8 | 7 |
| $n_{TB}$ | 1 | 2 | 3 | 4 | 5 | 6 | 8 | 10 | 12 | 15 | 16 | 20 | 24 | 30 | 32 |
| $s_{CRC}$ | 8 | | | | | | | | | | | | | |
| CS | CR 1/3 | | | | | | | | | | | | | |

FIG.5

LOW COMPLEXITY BLIND TRANSPORT FORMAT DETECTION

The present invention relates to a method, apparatus, and computer program product for detecting a transport format of a multiplexed transport channel used for transferring binary data. In particular, the present invention relates to a low complexity implementation for downlink Blind Transport Format Detection (BTFD) at a wireless receiver of a mobile communication system, such as a system according to the Universal Mobile Telecommunications System (UMTS) standard.

In Wideband Code Division Multiple Access (WCDMA) systems, a wide range of services that cannot be provided by the current wireless systems can be made available to both mobile and stationary users. Therefore, WCDMA air interface is dynamic with combined services consisting of voice, video, and packet data. To provide such dynamic combination of services, it is essential that the service combination information is successfully transmitted and decoded at the receiver. The WCDMA system uses a so-called transport format combination indicator (TFCI) code to transmit such information. According to a WCDMA specification of 3GPP (3rd Generation Partnership Project), when no TFCI is available, blind transport format detection (BTFD) has to be supported in downlink under certain restrictions.

In UMTS communication systems, at least a node B, which corresponds to a conventional base station device, and a mobile terminal referred to as user equipment (UE) are defined. Both node B and the UE include a transmitter and a receiver. The node B sends signals by means of the node B transmitter to the UE receiver in the downlink. The UE transmitter sends signals by means of the UE transmitter to the node B receiver in the uplink. Several UEs may communicate with a single node B. In this case, the UEs are said to be in the same cell. A cell represents the geographical area where a UE is served by a given node B. In uplink and downlink communication both the UE and node B map the information and control data to be transmitted in two logical channels. These logical channels are then mapped into transport channels (TrCH) which are themselves mapped into physical channels. A CCTrCH (Coded Composite TrCH) denotes a physical channel into which several transport channels are multiplexed. A transport channel is defined by how and with what characteristics data is transferred over the air interface. Generally, transport channels can be classified into dedicated channels (DCH) and common channels. In DS-CDMA (Direct Sequence Code Division Multiple Access), the physical channel is characterized by several parameters, comprising a specific carrier frequency, a scrambling code, a spreading factor, a channelization code, a slot format, a duration, etc. Although these parameters are well known to the person skilled in the art, the symbols' mapping into slots will be described below in more detail for a better understanding of transport format detection.

Figure 1:
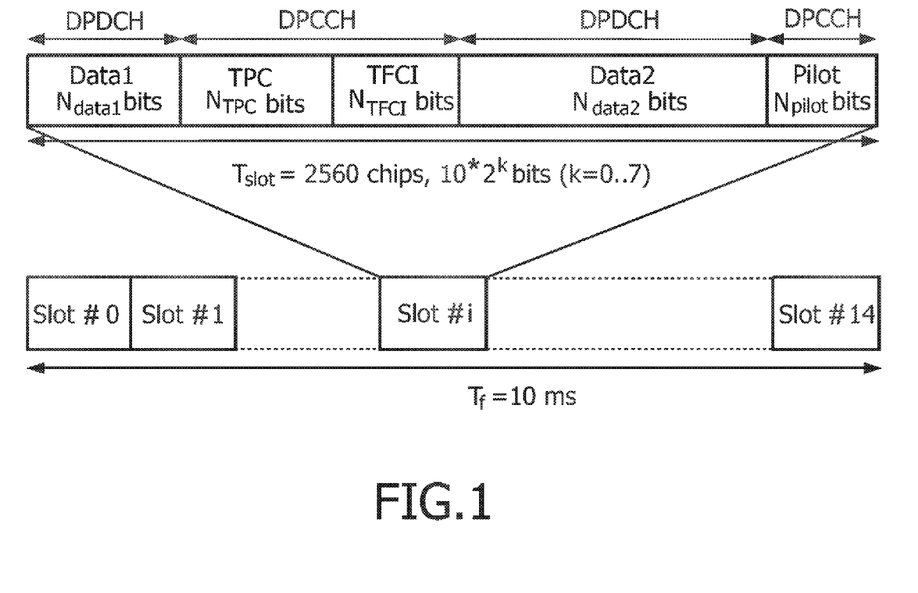
FIG. 1 shows a schematic structure of a downlink DPCH frame.

FIG. 1 shows a frame structure of a downlink dedicated physical channel (DPCH), which comprises two data fields Data1 and Data2, a TPC (Transmit Power Control) field, a pilot bit field, and a TFCI field. The slot format specifies the size (in bits) of each field. However, in DS-CDMA systems, the symbols are spread over a large bandwidth by filtering with specific spreading sequences. The spread symbols are referred to as chips, wherein the duration of a chip period is smaller than the duration of a symbol period by a factor approximately equal to the bandwidth expansion factor of the spreading operation. This factor is equal to the number of chips per symbol period and is referred to as spreading factor. In the example of FIG. 1, the duration of one slot corresponds to 2560 chips and thus $10 \times 2^k$ bits, assuming a spreading for k=0 . . . 7. One radio frame has a duration of 10 ms and consists of 15 slots.

As regards transport format detection, the specific field of interest is the TFCI field which is directly related to this detection. Transport format detection comprises determining the number and size of the transport blocks for each TrCH in a CCTrCH. This can be a TFCI-based detection if the transport format combination is signaled using the TFCI field. However, sometimes TFCI bits are not transmitted in order to minimize interference to other users, especially in cases where the spreading factor is high, so that the percentage of TFCI bits in each slot is also high. If TFCI bits are not available and if there is more than one transport format for a given TrCH, the BTFD procedure can be used.

At the receiver, a received signal is de-scrambled, de-spread, and then processed at a decoder. A de-rate matcher block reverses the puncturing and repetition effect of the transmitted data by inserting "0" at the punctured position. The de-rate matched data bits are decoded by a BTFD block.

"Blind Rate Detection Algorithm in WCDMA Mobile Receiver" by Insoo Sohn et al., Radio & Broadcasting Tech. Lab., ETRI, IEEE 2001, pp 1589-1592 describes a BTFD algorithm using Cyclic Redundancy Check (CRC) and Viterbi decoder matrix. For voice services in the WCDMA, a convolutional coding scheme is the preferred channel encoding method. The convolutional encoder is a finite-state machine that consists of an M-state shift register with prescribed connections to n modulo-2 adders. By convolutional coding the input data blocks, the encoder adds correlation to the input data sequence. The general algorithm in decoding the convolutional encoded data is the Viterbi algorithm, which is also a maximum-likelihood decoding algorithm. The Viterbi algorithm decodes the channel encoded data by searching the most likely decoding sequence by using the known correlation of the input data bit stream. The basic steps of the Viterbi algorithm comprise a first step of branch metric calculation, where a hypothesis is generated, which will be compared with the received data block. The branch metric is computed by adding the magnitudes of the received data bits that differ in sign from the hypothesis generated. In a second step of state metric calculation, the computed branch metric is added to the state metric calculated in the previous stage. The path with the lowest metric is identified and defined as a survivor path. Then, in a third step, a traceback operation is done by following the survivor path identified in the second step, when the state metric computation for all input symbols of the received data block has been completed.

The de-rate matched data bits received from the de-rate matcher block will be decoded by the BTFD method if the rate information (e.g. TFCI field) is not available. The first operation in BTFD is to calculate the branch metric and state metric, usually named as add-compare-select (ACS) operation, as in the Viterbi algorithm. However, due to the fact that the rate information is not available in the variable rate environment, the ACS operation has to be done for all possible lengths $n_{end}(i)$ of the data blocks for all rates i including the CRC parity bits.

The receiver only knows the possible transport formats and consequently all possible lengths of data blocks or end positions $n_{end}(i)$. The receiver performs Viterbi decoding on the received convolutionally coded code block. An important condition for BTFD to be used is that CRC with non-zero length is appended to all transport blocks on all explicitly detectable transport channels. CRC provides error detection on each transport block. In the UMTS standard, the size of the CRC may be 24, 16, 12, 8 or 0 bits. At the transmitter, the CRC is calculated on each transport block and directly appended to it. At the receiver, the CRC is recomputed on each decoded transport block and if there is a difference with the CRC appended at the transmitter level, the transport block under consideration is declared wrong, otherwise it is correct. The larger the CRC size is the more efficient is error detection. At the end of each code block, eight zero tail bits are appended. Thanks to these eight zero tail bits, the correct trellis path of the Viterbi decoder ends with high probability at a zero state at the correct end bit position. The BTFD method using CRC traces back the surviving trellis path ending at the zero state (hypothetical trellis path) at each possible end bit position to recover the data sequence. For each recovered data sequence, error detection is performed by checking the CRC, and if there is no error, the recovered sequence is declared to be correct.

In order to reduce the probability of false detection, which happens if the selected path is wrong but CRC misses the error detection, a path selection threshold is introduced in 3GPP specification TS25.212 Release 99. This threshold determines whether the hypothetical trellis path connected to the zero state should be traced back or not at each end bit position $n_{end}(i)$. If more than one end bit position leads to a threshold parameter smaller than the path selection threshold, and more than one end bit position leads to a correct CRC, the end bit position with the minimum threshold parameter value is declared to be correct. If not path satisfies the threshold parameter equation for all possible end bit positions, the received frame data is declared to be in error.

Figure 2:
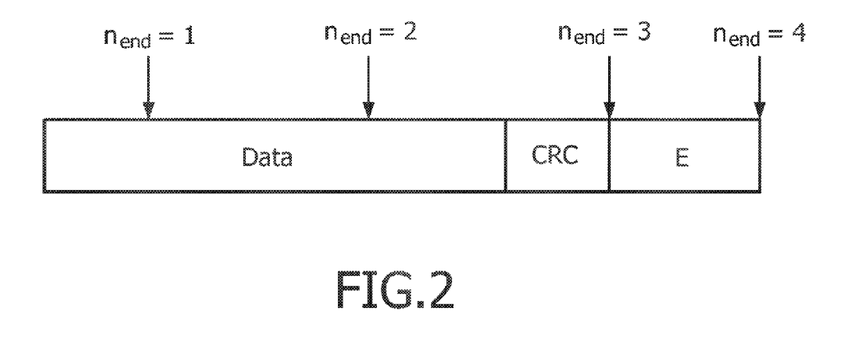
FIG. 2 shows a structure with possible end bit positions, on which the proposed format detection according to the present invention can be applied.

FIG. 2 shows a possible data structure on which BTFD is to be applied, wherein four possible end bit positions $n_{end}=1$ to $n_{end}=4$ are shown. The zero tail bits are indicated as an empty field E.

The above standard proposal for BTFD results in a complex implementation due to the fact that the path selection criteria based on the above threshold parameter equation is hard to compute in hardware or even in firmware. An iteration of up to 16 times may be required in a main loop, which is time-consuming in view of the fact that at maximum 16 end bit positions have to be checked. Moreover, the processing flow proposed by the standard makes an implicit assumption in that there is only one transport block and consequently only one CRC check per code block. However, in general this assumption is not true. Usually, there is more than one transport block per code block. Therefore the suggested 3GPP implementation is not really performing real transport format detection but nothing more than a code block length detection.

It is therefore an object of the present invention to provide a blind transport format detection method and apparatus, which can be implemented at reduced processing complexity while meeting the standard performance requirements.

This object is achieved by a method as claimed in claim 1, an apparatus as claimed in claim 9, and a computer program product as claimed in claim 13.

Accordingly, the steps after a path selection threshold are restricted to best end bit positions. For these best end bit positions, error checking is performed and if no error is detected, the current transport format is considered to be detected and BTFD ends at this step. Otherwise, the processing is stopped if the current transport format leads to the detection of an error. The proposed BTFD processing optimally exploits the whole available information and can be used with any kind of receiver at reduced processing time while satisfying performance requirements. As a result, faster BTFD processing with lower implementation complexity can be achieved, compared to the conventional BTFD processing, as initially described.

The selection may comprise rejecting end bit positions which lead to path metric values smaller than a predetermined threshold value, and sorting non-rejected end bit positions in a list from highest to lowest path metric values. Then, a data block may be declared wrong if all end bit positions are rejected. The ordering of non-rejected end bit positions in the list allows time saving by reducing average total number of error checks.

If two or more end bit positions lead to the same number in the calculation step, an end bit position which corresponds to a greater block size may be selected. A greater block size leads to a more reliable number of path metric values, so that more reliable and accurate results are treated first, to thereby optimize processing sequence.

Furthermore, the error checking may comprise sorting possible transport formats in decreasing order of transport block number, and starting the checking operation with the transport format with the highest number of data blocks. Thereby, the number of error checks is minimized and at the same time reliability of transport format detection can be increased.

If all error checking operations of the transport format leads to the result that checked blocks are correct, it is decided that a transport format is detected. On the other hand, if all transport formats associated with the selected best end bit positions have been checked without success, the data block corresponding to the currently tested end bit position is wrong.

The determination means of the detecting apparatus may comprise a Viterbi decoder. Furthermore, the calculation means may comprise a counter controlled by an output signal of a comparator arranged to compare respective path metric values determined by the determination means for a current state and for the initial state. Thereby, the required control logic can be implemented at low complexity.

In the following, the present invention will be described in more detail based on a predetermined embodiment with reference to the accompanying drawings, in which.

The preferred embodiment will now be described on the basis of an exemplary implementation with a UMTS baseband receiver, such as for instance a conventional RAKE receiver.

Radio propagation in a mobile channel is characterized by multiple reflections, diffractions and attenuations of the signal energy. These are caused by natural obstacles such as buildings, hills, and so on, resulting in so-called multi-path propagation. The multi-path propagation leads to a broadening of signal energy due to different propagation paths having a delay profile which extends over several microseconds. On the other hand, signal cancellation, called fast fading, takes places as the receiver moves across even short distances. Signal cancellation is best understood as a summation of several weighted phasors that describe the phase shift and attenuation along a certain path at a certain time instant.

A counter measure against fading in WCDMA systems is to combine delay dispersive energy by utilizing multiple so-called Rake fingers (correlation receivers) allocated to those delay positions on which significant energy arrives. To achieve this, time delay positions at which significant energy arrives are identified and correlation receivers or Rake fingers are allocated to those peaks. The measurement grid for acquiring the multi-path delay profile is in the order of one chip duration with an update rate in the order of some tens of milliseconds. Within each correlation receiver, fast-changing phase and amplitude values originating from the fast fading process are tracked and removed. Finally, demodulated and phase-adjusted symbols are combined across all active fingers and presented to the decoder for further processing. The channel-compensated symbols can be simply summed together to recover the energy across all delay positions. The radio frequency signal is then demodulated to generate a digital base-band signal. The base-band signal is processed to recover the useful information data intended for the user of interest.

According to the preferred embodiment, complexity of the BTFD scheme proposed by the 3GPP specifications is reduced while keeping the concept of path metric criteria (PMC) and redefining it in a simpler way.

In the specific case of the UMTS standard, the Viterbi decoder constraint length K should be "9", and consequently the number of internal states is $2^{K-1}=256$ at each trellis stage.

Figure 3:
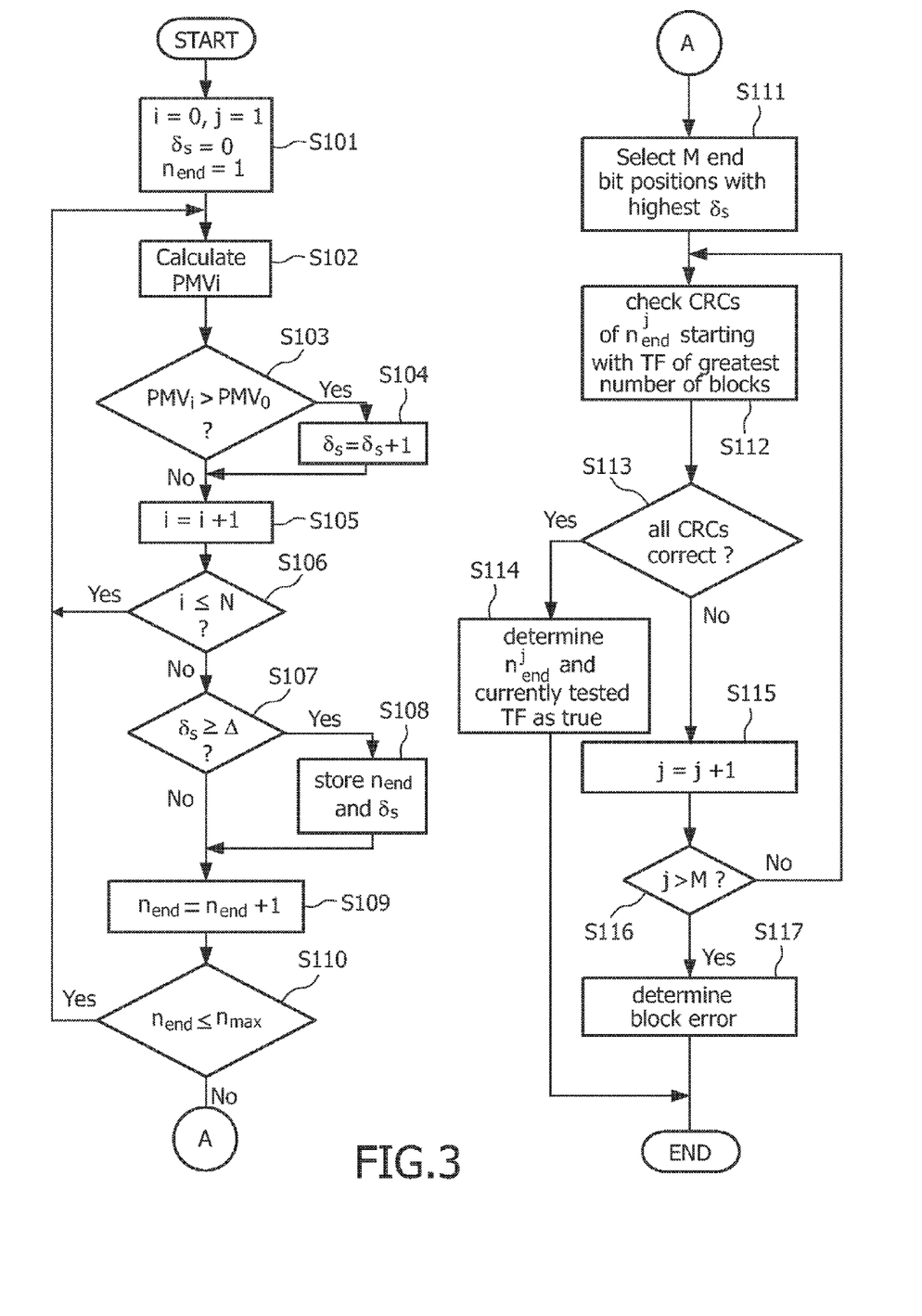
FIG. 3 shows a schematic flow diagram of the proposed format detection according to the preferred embodiment.

FIG. 3 shows a schematic flow diagram of the BTFD processing according to the preferred embodiment. In an initialization step S101, a running parameter i is set to "0", a further running parameter j is set to "1", a PMC parameter $\delta_s$ is set to "0", and an end bit position parameter $n_{end}$ is set to "1". Then, in step S102, a path metric values $PMV_i$ is calculated for the first end bit position $n_{end}=1$ and a first internal state i=0. In step S103, the calculated $PMV_i$ is compared to the initial $PMV_0$ at state i=0, and if the actual $PMV_i$ is superior or higher, the PMC parameter $\delta_s$ is incremented in step S104. Then, in step S105, the running parameter i is incremented and compared to a maximum value N which corresponds to the number of internal states (e.g. 256) at each trellis stage. As already mentioned, this maximum value N depends on the constraint length K of the Viterbi decoder.

As long as the running parameter i is below the maximum number N, the above steps S102 to S105 are repeated and the PMC parameter $\delta_s$ is incremented whenever a PMV value higher than the value $PMV_0$ at the initial state i=0 has been detected.

The PMC parameter $\delta_s$ can be an 8-bit integer number belonging to the range {0 ... 255}. For low noise levels on the radio channel, a value $\delta_s=255$ can be expected for the right end bit position. Accordingly, this new definition of the PMC obviously reduces implementation complexity compared to the PMC proposed by the 3GPP standard and calculated using the above mentioned threshold parameter equation.

In step S107, the PMC parameter $\delta_s$ obtained for the current state i is compared to a path selection threshold $\Delta$ and stored together with the corresponding end bit parameter $n_{end}$ if it is determined that it is greater than or equal to the path selection threshold $\Delta$ (step S108). If it is smaller than the path selection threshold $\Delta$, it is not stored and the end bit position $n_{end}$ is incremented in step S109. As long as there are still end bit positions available, i.e. as long as the end bit position $n_{end}$ is less or equal a maximum or final end bit position $n_{max}$, the procedure branches in step S110 to step S102 and the next value $PMV_i$ is calculated and processed in the above manner.

After all end bit positions $n_{end}$ have been checked, the M end bit positions with the highest PMC values $\delta_s$ are selected in step S111 and sorted in a list from highest to lowest PMC values $\delta_s$. As an example of the preferred embodiment, M=3 may be used, which means that the three best end bit positions are selected and sorted in step S111.

The path selection threshold $\Delta$ has to be finely tuned. If it is too little, the undetected false detection rate (UFDR), which is a rate of detections of a wrong code block size with correct CRC, will increase. On the other hand, with a more selective path selection threshold, the non-detection rate (NDR), which is the rate of missing detections of correct code block length, will reach an unacceptable level. It can be shown that at a path selection threshold $\Delta=200$, the loss of performance compared to the conventional 3GPP proposal is negligible while the reduction of complexity is still important, and the UMTS standard performance requirements can be met.

In step S112, CRCs for a selected one ($n^j_{end}$) of the best end bit positions area checked (j=1) starting with the transport format of greatest number of blocks. If it is detected in step S112 that all CRCs are correct, the procedure branches to step S114 and determines that the end bit position $n^j_{end}$ and the TF under consideration are true and the procedure ends here. On the other hand, if not all CRCs are determined to be correct in step S113, the other running parameter j is incremented to check the next one of the best end bit positions. It is however first checked in step S116 whether the other running parameter j is greater than the number M of selected best end bit positions. If not, the procedure returns to step S112 to check the CRCs of the next one of the best end bit positions. If all best end bit positions have been checked without success (i.e. at least one wrong CRC has been detected in each one of the best end bit positions), a block error is determined in step S117 and the procedure ends.

In order to avoid any loss of generality, an important aspect must be emphasized. Due to the particular Viterbi implementation to which the preferred embodiment relates, the more a hypothetical trellis path is likely to end at a given state, the lower this states metric will be. However, other Viterbi implementations can be found where the more a hypothetical trellis path is likely to end at a given state, the higher this states metric is. In case of such Viterbi designs, the PMC parameter $\delta_s$ would be, by definition, the number of path metric values from state 1 to N that are strictly inferior to the value at the initial state i=0. Then, inferior values of $\delta_s$ are counted in step S104, instead of superior ones.

According to the UMTS standard's restrictions on BTFD, a maximum of 16 possible end bit positions (i.e. code block sizes) are to be checked. Consequently, up to 16 PMC parameters $\delta_s$ have to be computed, followed by 16 comparisons with the path selection threshold $\Delta$. If $n_s$ denotes the number of end bit positions for which $\delta_s>\Delta$, then $n_s$ belongs to the range {0 ... 16}. The complexity of overall BTFD is however tightly linked to the value of $n_s$. It can be stated independent from the Viterbi implementation that the higher $n_s$ is, the greater the number of CRC checks will be. This is especially obvious when the transport channel on which BTFD is applied allows a lot of possible transport formats.

However, according to FIG. 3, complexity of the algorithm can be reduced by restricting the decoding and especially the traceback of the Viterbi memories and the CRC checks to a predetermined number M of best end bit positions (e.g. M=3), that is the M sizes leading to the greatest PMC parameter $\delta_s$, where $\delta_s>\Delta$. In FIG. 3, $n^1_{end}$, $n^2_{end}$ and $n^3_{end}$ denote the respective best end bit positions corresponding to the greatest $\delta_s$, the second greatest $\delta_s$ and the third greatest $\delta_s$, respectively. The best end bit position $n^1_{end}$ is treated first due to the fact that the higher $\delta_s$ is, the higher the probability of being at the right end bit position. The Viterbi memories trace back is performed and CRCs are checked on decoded bits, wherein the total number of CRC checks depends on the number of possible transport formats. If a transport format with all CRCs being correct is found, then the respective one of the best end bit positions is declared to be the right or correct end bit position and this transport format is declared blindly detected. Consequently, in this case, the BTFD procedure is stopped. On the other hand, if no transport format satisfies the condition "all CRC checks are correct", then the next best end bit position is verified and if the previously mentioned condition is still not satisfied, again the next best end bit position is processed until all best end bit positions have been checked.

It can be shown that by only considering M=3 best end bit positions, the performance degradation is very limited compared to the case where all $n_s$ positions would have been tested. This is due to the very low probability of having an end bit position with $\delta_s < \delta_s(n^3_{end})$ and all CRCs correctly decoded, while none of the three best end bit positions leads to a correct decoding of all CRCs for one of their possible transport formats.

If there are less than three block sizes or formats verifying $\delta_s > \Delta$, the same scheme is kept. The end bit positions may be sorted in decreasing order starting by the one with the greatest $\delta_s$. It can be shown that by doing so the UFDR can be kept lower. In the case where two or more end bit positions have the same value of the PMC parameter $\delta_s$, greater ones are privileged, that is, treated first. This is based on the assumption that the greater the size is, the more reliable the value of the PMC parameter $\delta_s$ will be. Some Viterbi decoding algorithm properties justify this assumption. Like many other accumulative algorithms, the longer the integration or accumulation window is, the more reliable and accurate the results will be.

If none of the three end bit positions leads to a correct decoding of all CRCs, the block is determined to be in error.

Of course, a different number M of best end bit positions may be selected based on specific requirements of the actual application.

Figure 4:
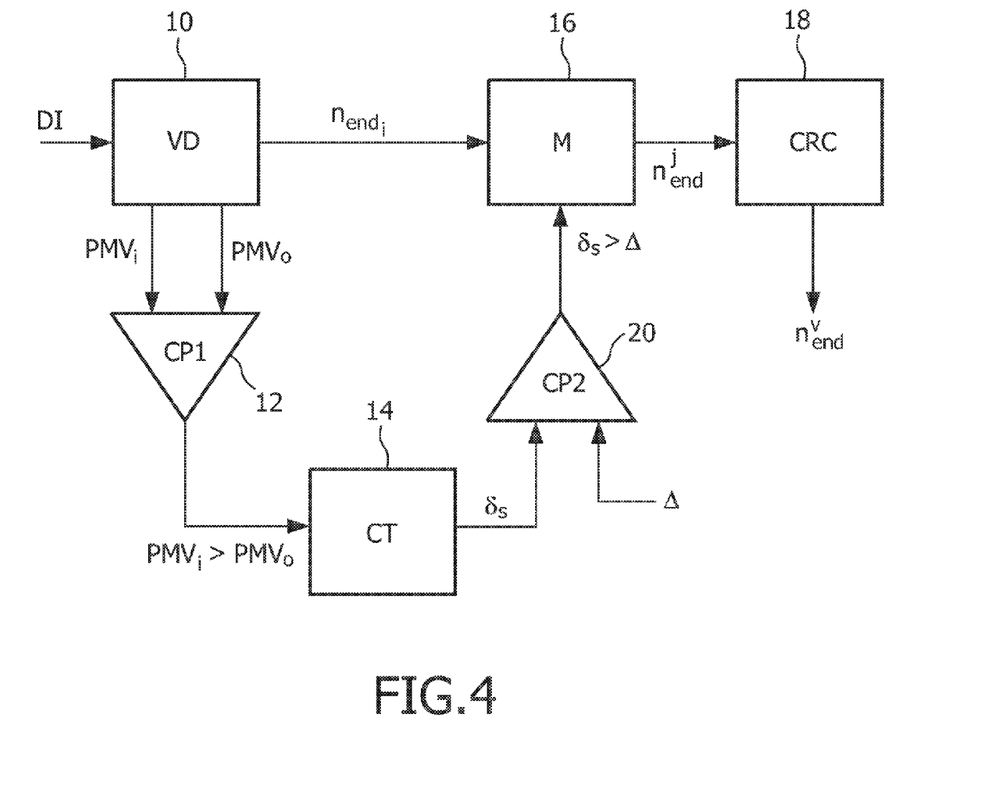
FIG. 4 shows a schematic block diagram of a format detection apparatus according to the preferred embodiment.

FIG. 4 shows a schematic block diagram of a discrete or hardware implementation of the procedure of FIG. 3. Input data DI is supplied to a Viterbi decoder 10 which calculates the initial $PMV_0$ and subsequent $PMV_i$ for the internal states at each trellis stage. The value $PMV_i$ of a specific state and the initial value $PMV_0$ are supplied to a first comparator 12 which outputs a logical state or pulse if the actual value $PMV_i$ is greater than the initial value $PMV_0$. Based on this output value, a counter 14 increments a count value, and after all internal states N have been processed, the final count value, which indicates the value of the PMC parameter $\delta_s$, is supplied to a second comparator 20 for comparison with a value corresponding to the path selection threshold $\Delta$ supplied thereto. The output of the second comparator 20 is used to trigger a storing or writing process into a memory 16, in which the actual end bit position $n_{end_i}$ is stored together with the determined counter value or PMC value $\delta_s$ as one of the best bit positions. After all end bit positions have been processed and the predetermined number M of best end bit positions have been stored in the memory 16, a CRC processing circuit 18 successively reads the stored best end bit positions $n^j_{end}$ and performs error checking starting from the best one of the best end bit positions to determine a verified or correct end bit position $n^v_{end}$ which indicates the detected transport format. If no end bit position is determined to be correct, a block error indication may be made by the CRC processing circuit 18.

Accordingly, transport format detection is basically performed by checking all CRCs corresponding to the transport formats with the selected best end bit positions.

Figure 5:
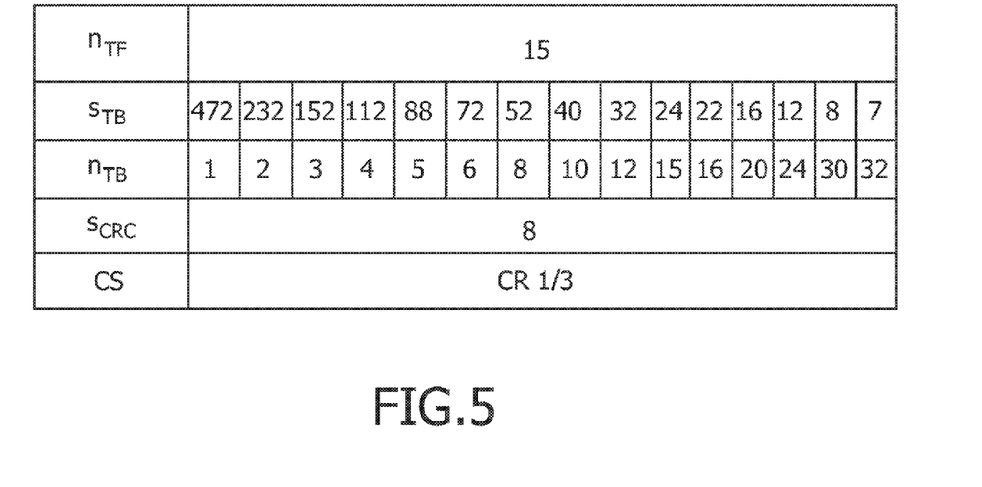
FIG. 5 shows a table of a most critical configuration of possible transport formats.

FIG. 5 shows a table indicating a worst or most critical configuration of different transport formats. In this table, a number $n_{TF}$ of transport formats is indicated together with possible transport block sizes $s_{TB}$ and transport block numbers $n_{TB}$. Furthermore, the CRC size $s_{CRC}$ and the coding scheme CS are indicated. The coding scheme CS indicates the convolutional rate CR of the convolutional coder. For example, if the constraint length is fixed to "9", the convolutional coder will output two bits if the CR is ½ and three bits if the CR is ⅓.

In view of the fact that all 15 transport formats of the table in FIG. 5 lead to the same code block size of "480" (i.e. $n_{TB} \times (s_{TB} + s_{CRC})$) this is actually the worst case for the 384 kbps class as specified in the above 3GPP specification. In this case, 188 CRC calculations would have been needed to test all transport formats.

In order to reduce the complexity of the overall procedure a method is proposed to minimize the number of CRCs to be checked and at the same time increase the reliability of transport format detection. The idea is to sort the transport formats in decreasing order of transport block number and to start CRC checking at the transport format with the greatest number of transport blocks. Then, a transport format is declared wrong as soon as one CRC check is wrong. Conversely, a transport format is considered detected and consequently the BTFD procedure is stopped when all the associated CRC checks are correct.

This decision scheme can be performed in step S112 of FIG. 3 and by the CRC processing circuit 18 of FIG. 4, presents several advantages. The highly protected transport formats which contain a lot of CRC bits are privileged and are treated first. In view of the fact that for high numbers of CRC checks the probability of having a full number of correct CRCs while the transport format is incorrect is fairly negligible and actually tends to zero, this approach yields to a reduced false transport format detection rate. Moreover, the greater the number of CRC checks is, the lower this false transport format detection rate will be. Another advantage is a decrease in the average number of CRC checks, which also means a reduced latency.

For instance, assuming that the best end bit position $n^1_{end}$ is a correct end bit position and the associated code block is perfectly decoded. Then, if the above list is not ordered as proposed previously or not even ordered at all and a transport format is determined with all CRCs being correct but the number of CRC checks not corresponding to the maximum number, it is impossible to conclude that this transport format is the right or correct transport format. There may exist another transport format for which all CRCs are correct but with a higher number of total CRC checks. In other words, when the above list is not properly ordered, the CRC should be verified on all transport formats, which finally leads to a greater number of CRC checks, and in most of the cases causes a non negligible latency. On the other hand, if the above list is appropriately ordered, the first transport format for which all CRCs are determined to be correct is considered to be the right transport format, and as a consequence, there is no use to perform any further CRC checking on the remaining transport formats. Therefore, this approach allows reduced latency by reducing in average the total number of CRC checks.

In summary, a method, apparatus and computer program product for detecting a transport format of a multiplexed transport channel used for transferring binary data are described, wherein a path metric value which estimates likelihood for a hypothetical trellis path to end at a predetermined state is determined for every state of a trellis stage of a possible end bit position of a data block of the transport channel. Then, for each possible end bit position a number of path metric values which indicate higher likelihood for the hypothetical trellis path to end at said predetermined state than an initial state is calculated, and the best end bit positions which lead to highest values of the calculated number are selected and error checking is performed for the selected best end bit positions to detect the transport format. The proposed selection of best end bit positions leads to a reduced number of decoding operations and thus to a reduced processing complexity.

It is noted that the present invention is not limited to the specific implementation of the above embodiment and variations and modifications can be made without departing from the scope of the invention as defined in the appended claims. In particular, the present invention is not limited to a UMTS application. It can be used in any application of DS-CDMA or other wireless communication systems where the communication standard envisages the presence of a logical channel comprising symbols or signal waveforms unknown at the receiver. There are numerous ways of implementing functions of the methods according to the invention by means of items of hardware or software, or both, provided that a single item of hardware or software can carry out several functions. It does not exclude that an assembly of items of hardware or software or both carry out a function. In particular, the procedure of FIG. 3 may be implemented based on discrete hardware devices, as indicated in FIG. 4, or may be implemented as a software routine controlling a processing device of the receiver. The software routine may be stored on a computer-readable medium and may be loaded into a memory of the receiver device after insertion of the computer readable medium at the receiver.

The hardware or software items can be implemented in several manners, such as by means of wired electronic circuits or by means of an integrated circuit suitably programmed respectively. Such an integrated circuit can be part of the receiver which can be contained in a computer or computer system, in a mobile communication handset, in a base station or in any other communication system device. The receiver may comprise means adapted to perform all necessary operations to support a certain type of communication services, implemented as hardware or software items. In particular, the means may be implemented as an assembly of items of hardware or software or both dedicated to a specific function, or it can be a single item carrying out several functions. The integrated circuit may comprise a set of instructions contained for instance in a computer-readable memory or in a stand-alone receiver memory and may cause the computer or the receiver to carry out the different steps of the proposed BTFD procedure. The set of instructions may be loaded into the programming memory by reading a data carrier such as, for instance, a disc. A service provider may as well make the set of instructions available via a communication network such as, for example, the Internet.

It will further be noted that the above mentioned embodiment illustrates rather than limits the invention, and that those skilled in the art will be capable of designing many alternative embodiments without departing from the scope of the invention as defined in the dependent claims. In the claims, any reference signs placed in parenthesis shall not be construed as limiting the claims. The words "comprising" and "comprises", and the like, do not exclude the presence of elements or steps other than those in any claim or the specification as a whole. The singular reference of an element does not exclude the plural reference of such elements and vice versa. If certain measures are recited in mutually different dependent claims, this does not indicate that a combination of these measures cannot be used the advantage.

The invention claimed is:

1. A method of detecting a transport format of a multiplexed transport channel used for transferring binary data, said method comprising the steps of:
   determining, using at least one of a discrete circuit and a programmed processor, for every state of a trellis stage of a possible end bit position of a data block of said transport channel a path metric value which estimates likelihood for a hypothetical trellis path to end at a predetermined state;
   calculating for each possible end bit position the number ($\delta_s$) of path metric values which indicate higher likelihood for the hypothetical trellis path to end at said predetermined state than an initial state;
   selecting a predetermined number of best end bit positions which lead to highest values of said number ($\delta_s$) of path metric values by rejecting end bit positions which lead to path metric values smaller than a predetermined threshold value, and sorting non-rejected end bit positions in a list from highest to lowest path metric values; and
   performing error checking for said selected best end bit positions to detect said transport format.

2. A method according to claim 1, further comprising declaring said data block wrong, if all end bit positions are rejected.

3. A method according to claim 1, wherein said predetermined number is three.

4. A method according to claim 1, further comprising selecting an end bit position which corresponds to a greater block size, if two or more end bit positions lead to the same said number ($\delta_s$) of path metric values.

5. A method according to claim 1, wherein said error checking comprises sorting possible transport formats in decreasing order of transport block number, and starting the checking operation with the transport format with the highest number of data blocks.

6. A method according to claim 5, further comprising deciding that a transport format is detected if all error checking operations of said transport format lead to the result that the checked blocks are correct.

7. A method according to claim 5, further comprising deciding that a data block is wrong if all transport formats associated with said selected best end bit positions have been checked without success.

8. An apparatus for detecting a transport format of a multiplexed transport channel used for transferring binary data, said apparatus comprising:
   determination means for determining for every state of a trellis stage of a possible end bit position of a data block of said transport channel a path metric value which estimates likelihood for a hypothetical trellis path to end at a predetermined state;
   calculation means for calculating for each possible end bit position the number ($\delta_s$) of path metric values which indicate higher likelihood for the hypothetical trellis path to end at said predetermined state than an initial state;
   selection means for selecting a predetermined number of best end bit positions which lead to highest values of said number calculated by said calculation means; and checking means for performing error checking for said selected best end bit positions to detect said transport format.

9. An apparatus according to claim 8, wherein said determination means comprises a Viterbi decoder.

10. An apparatus according to claim 8, wherein said calculation means comprise a counter controlled by an output signal of a comparator arranged to compare respective path metric values determined by said determination means for a current state and for said initial state.

11. An apparatus according to claim 8, wherein said apparatus comprises a receiver device for a wireless communication system.

12. A computer readable medium having computer-executable instructions stored thereon that, when executed by a processor, cause the processor to detect a transport format of a multiplexed transport channel used for transferring binary data by:

determining for every state of a trellis stage of a possible end bit position of a data block of said transport channel a path metric value which estimates likelihood for a hypothetical trellis path to end at a predetermined state;

calculating for each possible end bit position the number ($\delta_s$) of path metric values which indicate higher likelihood for the hypothetical trellis path to end at said predetermined state than an initial state;

selecting a predetermined number of best end bit positions which lead to highest values of said number ($\delta_s$) of calculated path metric values by rejecting end bit positions which lead to path metric values smaller than a predetermined threshold value, and sorting non-rejected end bit positions in a list from highest to lowest path metric values; and performing error checking for said selected best end bit positions to detect said transport format.

13. A computer readable medium of claim 12, wherein said instructions, when executed by a processor, further cause the processor to declare said data block wrong, if all end hit positions are rejected.

* * * * *

UNITED STATES PATENT AND TRADEMARK OFFICE
CERTIFICATE OF CORRECTION

PATENT NO.        : 7,979,782 B2                                   Page 1 of 1
APPLICATION NO.   : 11/722683
DATED             : July 12, 2011
INVENTOR(S)       : Franz Eder et al.

It is certified that error appears in the above-identified patent and that said Letters Patent is hereby corrected as shown below:

Column 12
Claim 13, Line 18, "processor to declare said data block wrong, if all end hit" should read as
--processor to declare said data block wrong, if all end bit--.

Signed and Sealed this
Twenty-third Day of August, 2011

David J. Kappos
*Director of the United States Patent and Trademark Office*